3,522,694
FLEXIBLE RECTANGULAR PANEL MOUNTINGS FOR TRACTOR-SUPPORTED ROTARY MOWER
Anders Horn, Williston, N. Dak., assignor to State Highway Department of the State of North Dakota, Bismarck, N. Dak.
Filed May 28, 1968, Ser. No. 732,727
Int. Cl. A01d 35/26
U.S. Cl. 56—25.4                 4 Claims

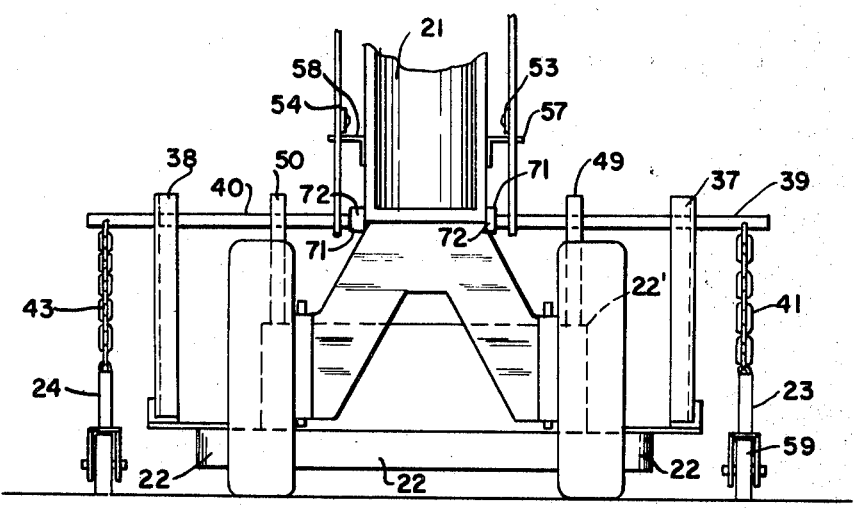
FIG.3.
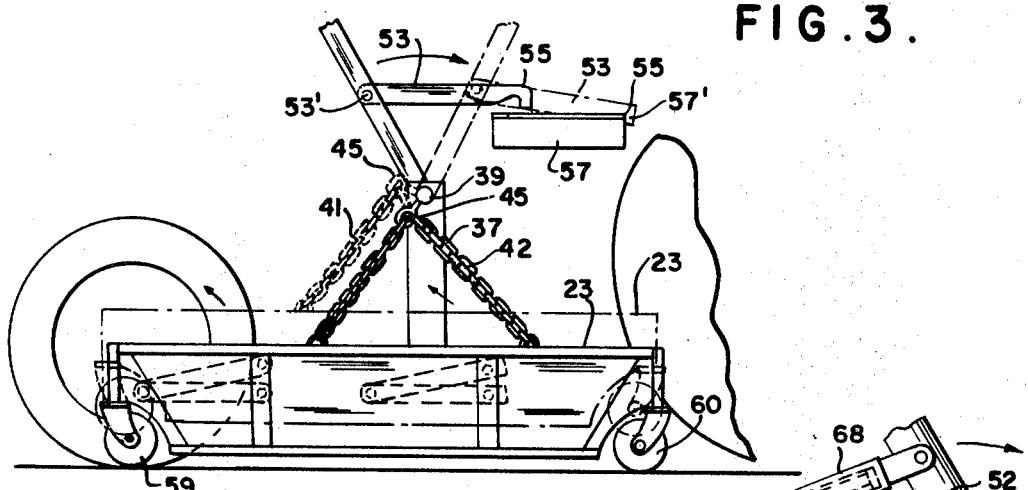
FIG.4.
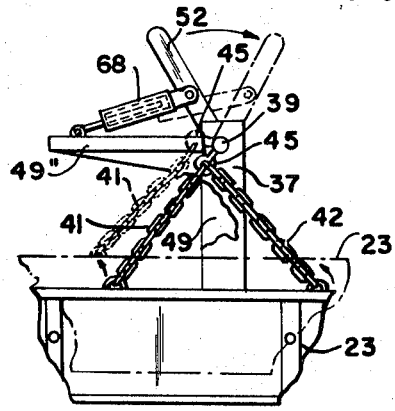
FIG.5.
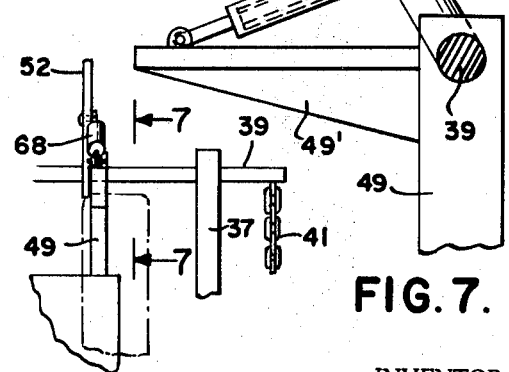
FIG.6.
FIG.7.
INVENTOR
Anders Horn
BY
ATTORNEY

# United States Patent Office 3,522,694
Patented Aug. 4, 1970

ABSTRACT OF THE DISCLOSURE

The invention comprises a mower guard for attachment to a rotary mower tractor having a pair of rectangular panels mounted to opposite sides of a tractor, said panels each having flexible material along their inner faces, rods extending laterally outward from opposite sides of the tractor, chains extending downward from the upper outer ends of the rods and attached to the panels, said rods being rotatable whereby the rotation of the rods will unwind the chains and raise the panels.

---

This invention relates to tractor mowers, more particularly, the invention relates to tractor mower guards.

It is an object of the invention to provide a novel tractor mower which guards the sides of the rotary mower and which may be raised and lowered in and out of position.

It is a further object of the invention to provide a novel tractor mower guard which may be attached to a conventional tractor and which guard has a covering of flexible material so as to absorb a substantial amount of the force of objects thrown from the mower against the guard.

It is a further object of the invention to provide a novel rotary mower guard which may be lowered into position for guarding the rotary mower when the mower is in operation and which may be raised when the rotary mower is not being operated.

Further objects and advantages of the invention will become apparent as the description proceeds and when taken in conjunction with the accompanying drawings wherein:

FIG. 3 is a front end view of the rotary mower guard invention.

FIG. 4 is a fragmentary side elevational view of the mower guard invention illustrating the guard in a raised and lowered position.

FIG. 5 is a fragmentary side elevational view of the modified form of the invention with a hydraulic piston and cylinder for raising and lowering the rotary mower guard.

FIG. 6 is a fragmentary front elevational view of the modified form of the invention.

FIG. 7 is an enlarged cross-sectional view of the modified form of the invention taken along line 7—7 of FIG. 6.

Briefly stated, the invention comprises a rotary mower guard device, adapted to be attached to a rotary mower tractor, said device comprising a pair of rectangular panels mounted on opposite sides of the tractor, said panels each having flexible material along their inner faces, rods extending laterally outward from opposite sides of the tractor, chains extending downward from the upper outer ends of the rods and fixed to the panels, said rods being rotatable with means for rotating the rods whereby the rotation of the rods will wind the chains onto the rods and raise the panels.

Figure 1:
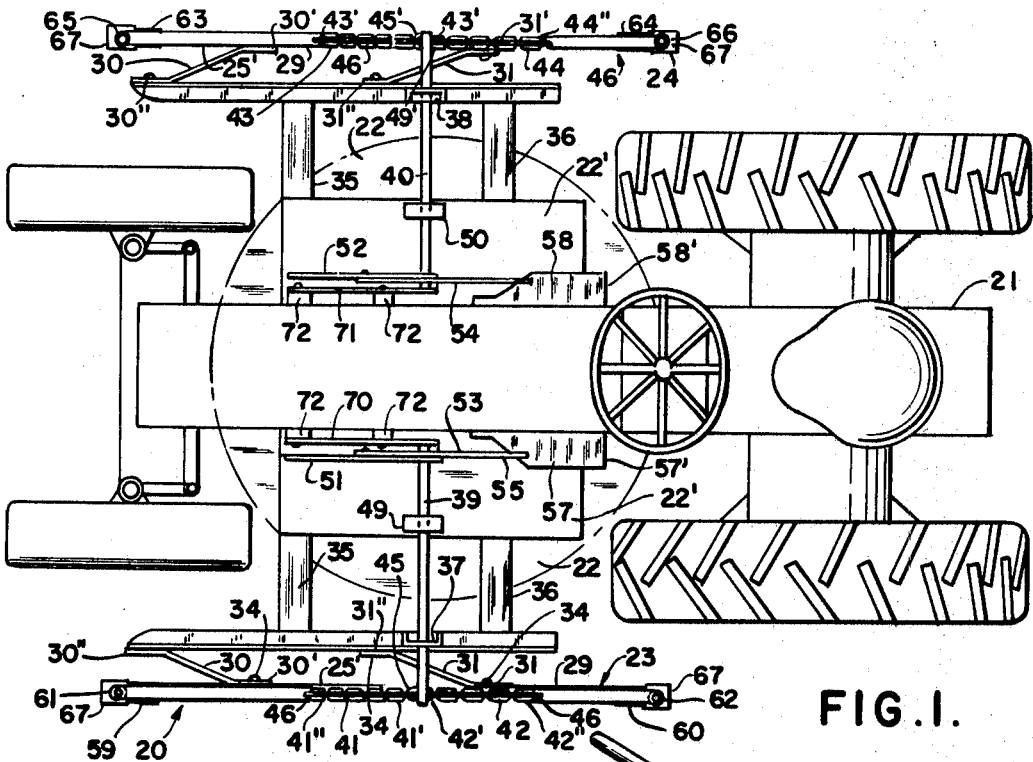
FIG. 1 is a top plan view of the rotary mower guard invention.

Referring more particularly to the drawings, in FIG. 1 the tractor mower guard inventions 20 is illustrated shown attached to a conventional mower tractor 21 having a conventional rotary mower housing 22 mounted beneath the tractor with a conventional rotary blade therein.

The mower guard device 20 has a pair of rectangular panels 23 and 24 positioned on opposite sides of the tractor 21.

The rectangular panels 23 and 24 each have a wooden framework 25, which framework has a wooden bar 26 across the top and a bar 26' along the bottom with triangular wooden end pieces 27 and 27' at each end fixed between the upper and lower bars 26 and 26', and with vertical cross-members 28 and 28' fixed between the upper and lower bars 26 and 26' to form the framework. A rectangular flexible canvas sheet 29 is fitted along the inside face 25' of the framework to cover the inner face 25'.

A pair of straps 30 and 31 have their one ends 30' and 31' pivotally mounted to the framework at the upright support cross-members 28 and 28', respectively, by bolts 34. The other ends of 30" and 31" of the straps are pivotally mounted to L-shaped bars 32 and 33 to form a parallel linkage between L-shaped bar 32 and the panel 23 and a parallel linkage between L-shaped bar 33 and panel 24.

The L-shaped bars 32 and 33 each have a pair of straps 35 and 36 fixed to the bars 32 and 33 and extending inwardly with their inner ends 35' and 36' fixed to the rotary blade housing 22. The L-shaped bars 32 and 33 each have an upright support 37 and 38 fixed to the L-shaped bars and extending upward.

A pair of cylindrical rods 39 and 40 are rotatably mounted to the supports 37 and 38, respectively, on opposite sides of the tractor. At the outer ends of each of the rods 39 and 40 are a pair of chains 41 and 42, and 43 and 44 respectively. The chains 41 and 42 have their upper ends 41' and 42' looped through a loop 45, which loop 45 is fixed to the bar 39. The chains 43 and 44 have their upper ends 43' and 44' looped through loop 45' which loop 45' is fixed to rod 40. The lower ends 41" and 42" of chains 41 and 42 are looped through loops 46 on the panel 23 and the lower ends 43" and 44" of chains 43 and 44 are looped through loops 47 on panel member 24. A second pair of upright support members 49 and 50 are fixed to the central stepped up portion 22' of the rotary blade housing 22, and the rods 39 and 40 are rotatably mounted on the support members 49 and 50, respectively. The inner ends of the rods 39 and 40 are also rotatably supported by elongated braces 70 and 71, which braces are fixed to the side of the tractor by being fixed to the lugs 72, which lugs in turn are fixed to the side of the tractor.

Handles 51 and 52 are fixed to the inner ends of the rods 39 and 40, respectively. Elongated latch plates 52 and 54 are identical to one another and are pivotally mounted at their one ends 53' and 54' and have notches 55 and 56 at their other ends. An L-shaped plate 57 is fixed to one side of the tractor 21 and an L-shaped plate 58 shaped in reverse relation to plate 57 is mounted to the opposite side of the tractor 21.

A pair of caster wheels 59 and 60 are rotatably mounted in sleeves 61 and 62 of panel member 23 and a similar pair of caster wheels 63 and 64 are rotatably mounted in sleeves 65 and 66 of panel member 24. Each caster wheel being rotatably mounted about a horizontal axis in U-shaped brackets 67 and the U-shaped brackets 67 having a stem which is rotatably mounted about a vertical axis in the respective sleeves 61, 62, 65 and 66.

OPERATION

Figure 2:
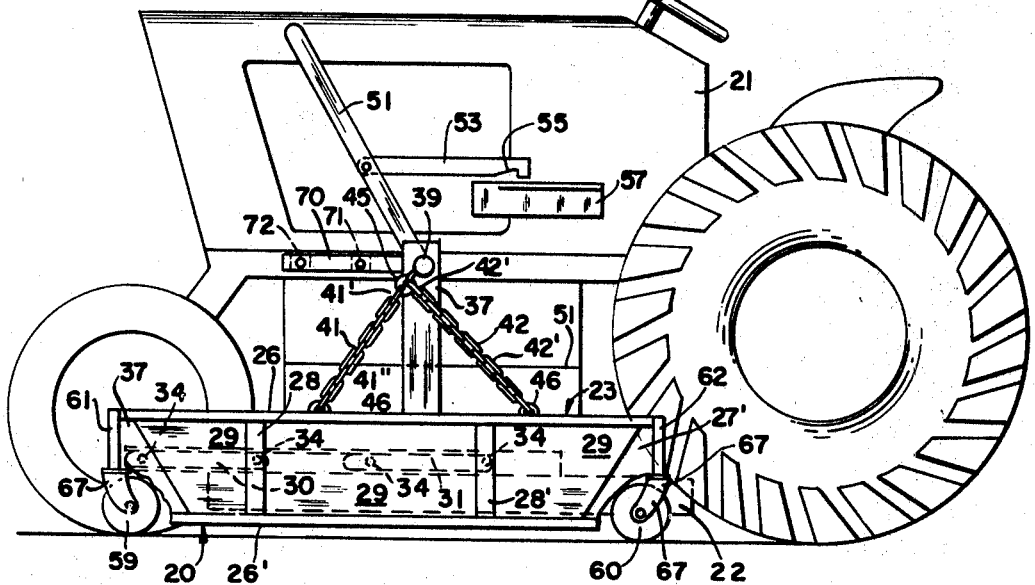
FIG. 2 is a side elevational view of the rotary mower guard invention.

The mower guard invention 20 is operated as follows:

As the tractor 21 moves forward with the rotary blades in the rotary blade housing 22 rotating and cutting the grass beneath, the panels 23 and 24 will be lowered to their positions shown in solid lines in FIGS. 1, 2, and 3.

When the panels 23 and 24 are in their lower operative position as shown in solid lines in FIGS. 1, 2, and 3, the caster wheels 59, 60, 63 and 64 will roll along the ground beside the tractor as the tractor moves forward.

The panels 23 and 24 will guard the sides of the rotary blades so that much of the stones and other debris thrown outward from the housing 22 by the rotary blade will strike against the canvas covering 29 on the inner faces 25' of the panels 23 and 24 deflecting and absorbing the force of the stones, slowing the stones down so that they will drop to the ground beside the canvas covering.

The panels 23 and 24 were lowered to their operative position by pivoting the lever arms or handles 51 and 52 forward counterclockwise when viewed from FIG. 1, thereby pivoting the rods 39 and 40 counterclockwise when viewed from FIG. 1, which unwinds the chains 41, 42 and 43 and 44, thereby lowering the panels 23 and 24, which will pivot downwardly about their parallel linkage by plates 30 and 31.

The panels 23 and 24 are raised and lowered in the same manner, except in reverse relation to each other. In order to raise the panel members 23 and 24 from their position shown in FIGS. 1, 2, 3 and 4, in solid lines, to their raised position, as illustrated in FIG. 4 in phantom lines for panel 24, the lever 51 and 52 will be pivoted clockwise when viewed from FIGS. 2 and 4, or from left to right when viewed from FIG. 1. Until the latch plates 53 and 54 slide over and lock into the rear edges 57' and 58' of plates 57 and 58, locking the handles 51 and 52 in their raised position shown in phantom lines in FIG. 4, the panel member 23 when the handle 51 has been pivoted to its raised locked position will be in its position shown in phantom lines in FIG. 4, the pivoting of handle 51 clockwise when viewed from FIG. 4, rotates the rod 39 clockwise pivoting loop 45 clockwise thereby winding the chains 41 and 42 raising the panel 23 pivoting the linkages 30 and 31 about the axis of pivots 34, thereby raising the panel 23 in parallelism. The panel member 24 and its associated structure will be raised in the same manner to the same raised position as shown in phantom lines in FIG. 4, only in opposed relation on the opposite side of the tractor.

To lower the panels 23 and 24 from the raised position, the operator only needs to raise and release the latch plates 53 and 54, and the panels 23 and 24 will gravitate to their lower operative position.

While the panels 23 and 24 are in their lower operative position, they are free to move upward and downward to ride over terrain that may be different in elevation from that of the tractor wheels.

In the modified form of the invention illustrated in FIGS. 5, 6, and 7, the handle 52 is shortened and a hydraulic cylinder 68 is pivotally mounted at one end to the handle 52 and is pivotally mounted at the other end to a lateral ledge extension 49' fixed to the upright post 49. By energizing the hydraulic cylinder 68, the handle 52 is pivoted clockwise when viewed from FIG. 5 thereby rotating the rod 39 thereby winding the chains 41 and 42 raising the panel 23 from its position shown in solid lines to its position shown in phantom lines in FIG. 5. To lower the panel member 23, the hydraulic cylinder 68 will be deactivated causing the panel 23 to return to its lower operative position. A similar hydraulic cylinder and linkage will be provided for the raising and lowering of panel member 24.

The guard panels 23 and 24 are spaced far enough away from the front wheels of the tractor so that the tractor may be maneuvered to either the left or right with relative freedom from interference from the panels or its associated structure.

Thus it will be seen that a novel rotary tractor mower guard has been provided which will not interfere with the mowing operation and which will guard the mower blade from throwing rocks and other debris out from the tractor to prevent injury and damage to persons or objects nearby.

What is claimed is:

1. A mower guard attachment for a rotary mower tractor having a rotary blade mounted beneath the tractor and a housing surrounding said blade, a pair of elongated panels mounted on opposite sides of said housing and extending vertically downward, linkage means connecting said panels to tractor lever means and said lever means mounted to said tractor and movable to actuate said linkage means whereby said panels may be raised and lowered relative to said tractor and relative to said rotary blade and housing, said panels when in a lowered position being laterally adjacent the rotary blade housing and acting to deflect the flight of objects propelled outward by the rotary blade.

2. A mower guard attachment for a rotary mower tractor having a rotary blade housing, a rotary blade comprising a pair of panels mounted on opposite sides of said housing and extending vertically downward, linkage means connecting said panel to said tractor, lever means actuating said linkage means whereby said panels may be raised and lowered relative to said tractor and relative to said rotary blade and housing, said panels having wheels along their lower edges, said panels when in their lowered position being adapted to ride along the ground on said wheels beside said tractor, with said panels laterally adjacent said rotary blade and acting to deflect objects propelled outward by said rotary blade.

3. A mower guard attachment for a rotary mower tractor according to claim 2 wherein said linkage means being activated by said lever means will raise and lower said panels in parallelism to the ground.

4. A mower guard attachment for a rotary mower tractor according to claim 3 wherein said panels have flexible surfaces to absorb the force of objects propelled outward by the rotary blade.

References Cited

UNITED STATES PATENTS

| | | | |
|---|---|---|---|
| 2,369,850 | 2/1945 | Powers | 56—25.4 |
| 2,928,223 | 3/1960 | Danuser | 56—25.4 |
| 2,963,842 | 12/1960 | Estes | 56—25.4 |
| 3,093,948 | 6/1963 | Root | 56—25.4 |
| 3,450,211 | 6/1969 | Becker et al. | 56—25.4 X |

FOREIGN PATENTS 976,056  11/1964  Great Britain.

ROBERT PESHOCK, Primary Examiner

J. N. ESKOVITZ, Assistant Examiner